United States Patent
Sato et al.

(10) Patent No.: US 11,421,071 B2
(45) Date of Patent: Aug. 23, 2022

(54) PHOSPHORUS-CONTAINING EPOXY RESIN, EPOXY RESIN COMPOSITION, PREPREG, LAMINATED PLATE, MATERIAL FOR CIRCUIT BOARD AND CURED PRODUCT

(71) Applicant: NIPPON STEEL Chemical & Material Co., Ltd., Tokyo (JP)

(72) Inventors: Hiroshi Sato, Tokyo (JP); Yuko Shibata, Tokyo (JP); Tomoyuki Suzuki, Tokyo (JP)

(73) Assignee: NIPPON STEEL Chemical & Materials Co., Ltd., Tokyo (JP)

( * ) Notice: Subject to any disclaimer, the term of this patent is extended or adjusted under 35 U.S.C. 154(b) by 32 days.

(21) Appl. No.: 17/271,216

(22) PCT Filed: Aug. 20, 2019

(86) PCT No.: PCT/JP2019/032334
§ 371 (c)(1),
(2) Date: Feb. 25, 2021

(87) PCT Pub. No.: WO2020/045150
PCT Pub. Date: Mar. 5, 2020

(65) Prior Publication Data
US 2021/0253783 A1    Aug. 19, 2021

(30) Foreign Application Priority Data
Aug. 27, 2018  (JP) .............................. JP2018-158145

(51) Int. Cl.
C08G 59/14    (2006.01)
C08J 5/24     (2006.01)

(52) U.S. Cl.
CPC .......... C08G 59/1488 (2013.01); C08J 5/244 (2021.05); *C08J 2363/00* (2013.01)

(58) Field of Classification Search
CPC ................. C08G 59/1488; C08G 59/3272
See application file for complete search history.

(56) References Cited

U.S. PATENT DOCUMENTS

2017/0292018 A1   10/2017   Wu et al.
2018/0112029 A1    4/2018   Kuwajima et al.

FOREIGN PATENT DOCUMENTS

| JP | H11166035 | 6/1999 |
| JP | H11279258 | 10/1999 |
| JP | 2001019746 | 1/2001 |
| JP | 2002206019 | 7/2002 |
| JP | 2005206706 | 8/2005 |
| JP | 2007059838 | 3/2007 |
| JP | 2013035921 | 2/2013 |
| JP | 2013103974 | 5/2013 |
| JP | 2013107980 | 6/2013 |
| JP | 2017528578 | 9/2017 |
| WO | 2013187184 | 12/2013 |
| WO | 2016175295 | 11/2016 |
| WO | 2019065552 | 4/2019 |

OTHER PUBLICATIONS

"International Search Report (Form PCT/ISA/210) of PCT/JP2019/032334," dated Nov. 12, 2019, with English translation thereof, pp. 1-4.
"International Preliminary Report on Patentability of PCT/JP2019/032334; this report contains the following items : PCT/IB/373, PCT/ISA237(cover sheet), PCT/ISA237(Box No. I), PCT/ISA237(Box No. V)", dated Mar. 2, 2021 and Nov. 12, 2019, which is English translation of "Written Opinion of the International Searching Authority", p. 1-p. 11.

Primary Examiner — Megan McCulley
(74) Attorney, Agent, or Firm — JCIPRNET

(57) ABSTRACT

An object is to provide an epoxy resin composition which exhibits excellent tracking resistance and additionally has excellent heat resistance with a Tg of 200° C. or higher and flame retardancy. Provided is an epoxy resin composition which contains a phosphorus-containing epoxy resin and a curing agent and has a phosphorus content of within a range of 1.0 to 1.8%, wherein the phosphorus-containing epoxy resin has a ratio (L/H) of 0.6 to 4.0 of the content of trinuclear bodies (L) to the content of hepta or higher nuclear bodies (H) measured by GPC, and is a product obtained from a novolac epoxy resin having an average number of functional groups (Mn/E) of 3.8 to 4.8 and a phosphorus compound represented by the following general formula (1) and/or general formula (2).

8 Claims, 1 Drawing Sheet

PHOSPHORUS-CONTAINING EPOXY RESIN, EPOXY RESIN COMPOSITION, PREPREG, LAMINATED PLATE, MATERIAL FOR CIRCUIT BOARD AND CURED PRODUCT

CROSS-REFERENCE TO RELATED APPLICATION

This application is a 371 application of an international PCT application serial no. PCT/JP2019/032334, filed on Aug. 20, 2019, which claims the priority benefit of Japan Patent Application No. 2018-158145, filed on Aug. 27, 2018. The entirety of each of the above-mentioned patent applications is hereby incorporated by reference herein and made a part of this specification.

TECHNICAL FIELD

The present invention relates to an epoxy resin composition used for producing a copper-clad laminated plate, a film material, a resin-coated copper foil, and the like used in an electronic circuit board, a phosphorus-containing epoxy resin having flame retardancy such as a sealing material, a molding material, a casting material, an adhesive, an electrical insulation coating material and the like used in an electronic component, a flame-retardant epoxy resin composition using the epoxy resin, and a cured product thereof.

BACKGROUND ART

In recent years, efforts to make electronic devices flame-retardant have been focused on measures for reducing the amount of toxic gases generated during combustion in consideration of an influence on the environment. These measures range from flame retardancy with a halogen-containing compound represented by a conventional brominated epoxy resin to halogen-free flame retardancy in which flame retardancy is achieved with an organic phosphorus compound. These measures are widely used and recognized not only in electronic circuit boards but also generally for phosphorus flame retardancy, and are also applied in the field of epoxy resins related to circuit boards.

As a specific representative example of an epoxy resin to which such flame retardancy is imparted, it has been proposed to apply an organic phosphorus compound as disclosed in PTL 1 to 4. PTL 1 discloses a thermosetting resin obtained by reacting 9,10-dihydro-9-oxa-10-phospha-phenanthrene-10-oxide (DOPO) with an epoxy resin at a predetermined molar ratio.

In addition, PTL 2 discloses a phosphorus-containing epoxy resin composition obtained by reacting an organic phosphorus compound having active hydrogen obtained by reacting a quinone compound with organic phosphorus compounds having one active hydrogen bonded to a phosphorus atom represented by DOPO with epoxy resins including a novolac epoxy resin.

In the above patent literature, since a phosphorus compound exhibiting flame retardancy is reacted with a multifunctional epoxy resin, a glass transition equivalent to the FR-4 substrate can be obtained according to heat resistance after curing using a curing agent. However, in recent years, with the progress of having high density mounting on substrates and mounting from automobile cabins to the vicinity of hood drive units, a glass transition temperature (Tg) which indicates heat resistance equivalent to FR-5 has come to be required as a higher temperature in reality.

PTL 3 discloses an example in which a phosphorus-containing epoxy resin combined with a trifunctional epoxy resin in which a higher Tg than that of a conventional novolac epoxy resin can be obtained is synthesized, and a cured product thereof has a Tg of about 180° C. In addition, PTL 4 discloses an example in which, regarding a phosphorus-containing epoxy resin having high heat resistance obtained by reacting a phosphorus-containing oligomer obtained by reacting a phosphorus compound with hydroxybenzaldehyde with a multifunctional epoxy resin, a cured product thereof has a Tg of 185° C. Regarding such substrates having a heat resistance standard equivalent to FR-5, many techniques have been disclosed and become mainstream.

On the other hand, in the automobile industry in which such substrates are used and mounted, the trend to motor-powered hybrid vehicles or electric vehicles in consideration of the energy environment from conventional engine driving is becoming mainstream, and in order to further secure comfortable driving and safe driving in these movements, the trend to electronic control with various mounted sensors is progressing. An engine that adjusts fuel consumption and an output and an engine control unit near the motor are naturally exposed to an environment with a high degree of pollution under a constant high temperature, and they become an area that cannot be handled with heat resistance equivalent to conventional FR-5, and there is also a demand for a Tg of 200° C. or higher. A substrate used in such an environment has a characteristic in which tracking resistance is also becoming very important for insulation reliability.

PTL 5 discloses a composition in which a reactive phosphate is reacted with a multifunctional epoxy resin, flame retardancy and heat resistance are exhibited, and tracking resistance is excellent. However, here, the basis of excellent tracking resistance is not particularly mentioned and the heat resistance is also equivalent to FR-4 to FR-5 with a Tg of 155° C. In addition, PTL 6 discloses an epoxy resin composition having excellent heat resistance at a flame retardancy of V-0 level in a halogen-free phosphorus flame retardant system having excellent tracking resistance. However, in this case also, the heat resistance is equivalent to FR-4 to FR-5, and is insufficient with respect to heat resistance with a Tg of 200° C. or higher.

PTL 7 discloses an epoxy resin composition for a prepreg having halogen-free flame retardancy and excellent heat resistance. This resin composition contains a multifunctional epoxy resin having 2.8 or more functional groups, and when 20 parts by mass or more and less than 180 parts by mass of aluminum hydroxide or magnesium hydroxide having excellent thermal decomposability with respect to the resin solid content is used, a cured product having excellent flame retardancy, thermal rigidity, and heat resistance is provided. However, the favorable flame retardancy here is the result of actual measurement in a very thin film of 0.2 mm, and it cannot be said that sufficient flame retardancy can be obtained in a laminated plate having a thickness of 0.8 to 1.6 mm, which is a general plate thickness. Therefore, in order to obtain sufficient flame retardancy in such a general thick plate substrate, it is necessary to increase the phosphorus content, and in this case, the tracking resistance is impaired.

Improvement in tracking resistance of a phosphorus-containing epoxy resin is not mentioned in any of these documents, and no means or effects for increasing heat resistance and maintaining and improving flame retardancy have been found.

CITATION LIST

Patent Literature

[PTL 1] Japanese Patent Application Publication No. H11-166035
[PTL 2] Japanese Patent Application Publication No. H11-279258
[PTL 3] Japanese Patent Application Publication No. 2002-206019
[PTL 4] Japanese Patent Application Publication No. 2013-035921
[PTL 5] Japanese Patent Application Publication No. 2001-019746
[PTL 6] Japanese Translation of PCT Application No. 2017-528578
[PTL 7] Japanese Patent Application Publication No. 2007-059838

SUMMARY OF INVENTION

As a non-halogen-based epoxy resin cured product, an epoxy resin composition that maintains heat resistance with a Tg of 200° C. or higher and exhibits excellent flame retardancy and tracking resistance is provided.

The inventors conducted extensive studies in order to address these problems, and as a result, found that, in a novolac epoxy resin which is a raw material of the phosphorus-containing epoxy resin, improving heat resistance, flame retardancy, and also tracking resistance according to the ratio between polymer components with hepta or higher nuclear bodies and trinuclear bodies, and the average number of functional groups associated therewith is highly effective.

That is, the present invention is an epoxy resin composition which contains a phosphorus-containing epoxy resin and a curing agent and has a phosphorus content of within a range of 1.0 to 1.8 mass %, wherein the phosphorus-containing epoxy resin is a product obtained from a novolac epoxy resin having a ratio (L/H) of the content (area %, L) of trinuclear bodies to the content (area %, H) of hepta or higher nuclear bodies measured by gel permeation chromatography (GPC) of within a range of 0.6 to 4.0, and having a value of an average number of functional groups (Mn/E) obtained by dividing a number average molecular weight (Mn) by an epoxy equivalent value (E) of within a range of 3.8 to 4.8, and a phosphorus compound represented by the following general formula (1) and/or general formula (2).

Here, for GPC measurement conditions, columns (TSKgelG4000H$_{XL}$, TSKgelG3000H$_{XL}$, TSKgelG2000H$_{XL}$ commercially available from Tosoh Corporation) provided in series are used at 40° C., tetrahydrofuran (THF) is used as an eluent, the flow rate is 1 mL/min, and a differential refractometer (RI) detector is used as the detector. 0.1 g of a sample is dissolved in 10 mL of THF, 504 of the sample is injected into the column, and the number average molecular weight (Mn) of the novolac epoxy resin and the content (area %) of each nuclear body are measured according to a standard polystyrene calibration curve.

[Chem. 1]

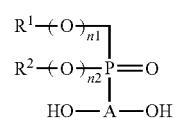

(1)

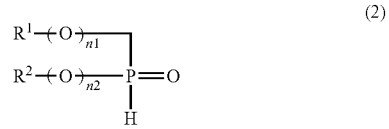

(2)

In general formulae (1) and (2), $R^1$ and $R^2$ are a hydrocarbon group having 1 to 20 carbon atoms which may have heteroatoms, and may be different from each other or may be the same, and may be linear, branched, or cyclic, or $R^1$ and $R^2$ may be bonded to form a cyclic structure site; n1 and n2 each independently represent 0 or 1; and A represents a trivalent aromatic hydrocarbon group having 6 to 20 carbon atoms.

The novolac epoxy resin is preferably a phenol novolac epoxy resin, and the curing agent preferably contains one or more selected from among dicyandiamide, phenolic resins and oxazine resins.

In addition, the present invention provides a cured product obtained by curing the above epoxy resin composition, and a prepreg, a laminated plate, or a material for circuit boards using the above epoxy resin composition.

In addition, the present invention is a method of producing a phosphorus-containing epoxy resin obtained from a novolac epoxy resin and the phosphorus compound represented by general formula (1) and/or general formula (2), and in which the novolac epoxy resin has a ratio (L/H) of the content (area %, L) of trinuclear bodies to the content (area %, H) of hepta or higher nuclear bodies measured by GPC of within a range of 0.6 to 4.0, and an average number of functional groups (Mn/E) obtained by dividing a number average molecular weight (Mn) based on a standard polystyrene conversion value by an epoxy equivalent (E) of within a range of 3.8 to 4.8.

The present invention is an epoxy resin composition using a phosphorus-containing epoxy resin obtained by reacting a specific phosphorus compound with a novolac epoxy resin having a specific molecular weight distribution and a specific average number of functional groups as essential components, and when the novolac epoxy resin having a specific molecular weight distribution and a specific average number of functional groups is used, it is possible to provide a cured product that can achieve both heat resistance with a Tg of 200° C. or higher and flame retardancy which cannot be obtained with a conventional phosphorus-containing epoxy resin, and also has favorable tracking resistance.

DESCRIPTION OF EMBODIMENTS

Figure 1:
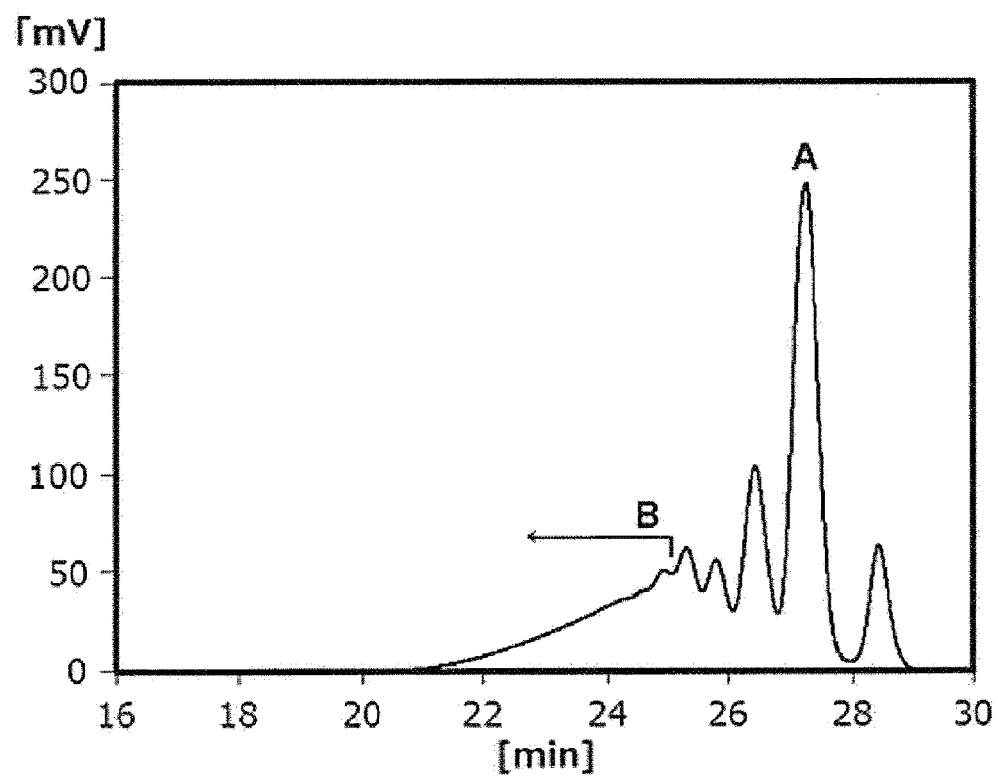
FIG. 1 shows a GPC chart of a novolac epoxy resin obtained in Synthesis Example 3.
Figure 2:
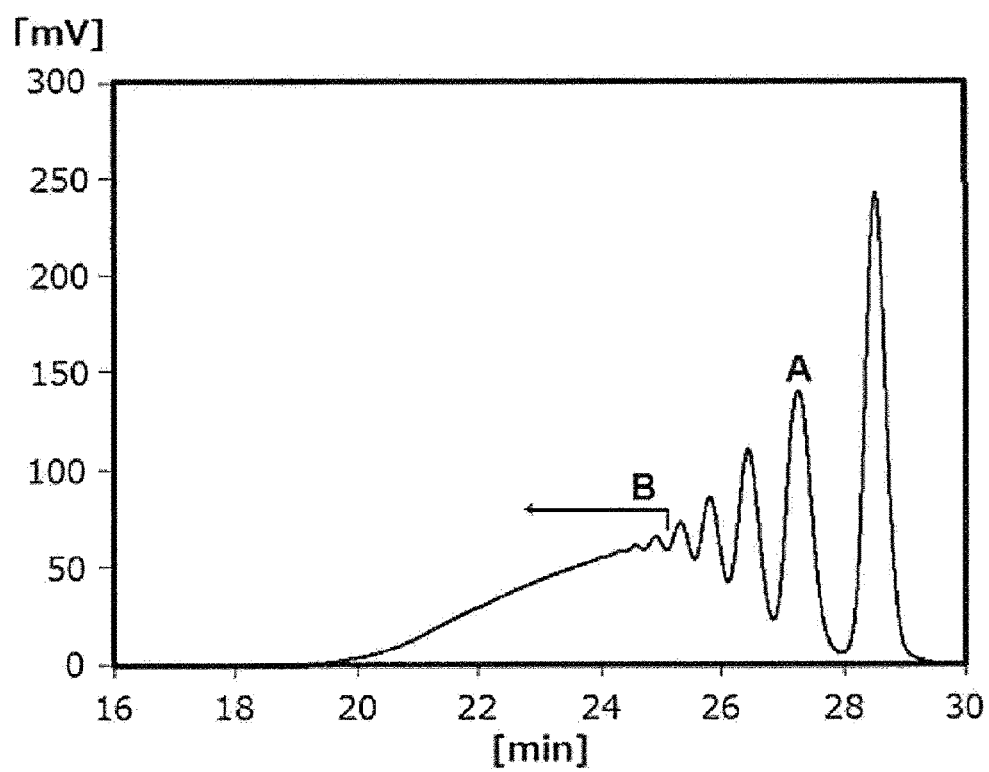
FIG. 2 shows a GPC chart of a general-purpose phenol novolac epoxy resin.

Embodiments of the present invention will be described below in detail.

An epoxy resin composition of the present invention includes a phosphorus-containing epoxy resin and a curing agent as essential components, and has a phosphorus content of within a range of 1.0 to 1.8 mass %. The phosphorus content in the epoxy resin composition in this specification is a proportion in the organic component excluding a solvent and an inorganic filler from the epoxy resin composition.

When the phosphorus content is less than 1.0 mass %, there is a risk of insufficient flame retardancy. When the phosphorus content exceeds 1.8 mass %, there is a risk of a heat resistance of Tg=200° C. or higher not being secured. The preferable range of the phosphorus content is 1.5 to 1.8 mass %.

The phosphorus-containing epoxy resin is obtained by reacting a novolac epoxy resin having a specific molecular weight distribution and a specific average number of functional groups with a phosphorus compound represented by general formula (1) and/or a phosphorus compound represented by general formula (2). When the phosphorus compound of general formula (2) is used alone, the heat resistance of the composition decreases, thus it is preferable to increase the proportion of the phosphorus compound of general formula (1). Specifically, the molar ratio of the phosphorus compound of general formula (1) to the phosphorus compound of general formula (2) is preferably 99:1 to 75:25 and more preferably 95:5 to 85:15. This range is preferable in consideration of handling of the viscosity of a phosphorus-containing epoxy resin composition, which influences impregnation into glass cloth.

Here, in terms of the molar ratio of raw materials, for example, if the phosphorus compound of general formula (2) is DOPO, and the phosphorus compound of general formula (1) is a reaction product of DOPO and naphthoquinone (NQ), the molar ratio of the phosphorus compound of general formula (1) to the phosphorus compound of general formula (2) corresponds to 50:50 when NQ/DOPO (molar ratio) is 0.50 and corresponds to 99:1 when NQ/DOPO (molar ratio) is 0.99.

Regarding the phosphorus compound, it is necessary to use the phosphorus compound represented by general formula (1) or general formula (2), and they may be used alone or in combination.

In general formula (1) or general formula (2), $R^1$ and $R^2$ represent a hydrocarbon group having 1 to 20 carbon atoms, which may have heteroatoms, and may be different from each other or may be the same, and may be linear, branched, or cyclic. In addition, $R^1$ and $R^2$ may be combined to form a cyclic structure. In particular, an aromatic ring group such as a benzene ring is preferable. When $R^1$ and $R^2$ are aromatic ring groups, they may have an alkyl group having 1 to 8 carbon atoms, an alkoxy group having 1 to 8 carbon atoms, a cycloalkyl group having 5 to 8 carbon atoms, an aryl group having 6 to 10 carbon atoms, an aralkyl group having 7 to 11 carbon atoms, an aryloxy group having 6 to 10 carbon atoms or an aralkyloxy group having 7 to 11 carbon atoms as a substituent. Examples of heteroatoms include an oxygen atom, which can be provided between carbon atoms constituting a hydrocarbon chain or a hydrocarbon ring.

n1 and n2 each independently represent 0 or 1.

A represents a trivalent aromatic hydrocarbon group having 6 to 20 carbon atoms, and is preferably a benzene ring group or a naphthalene ring group. The aromatic hydrocarbon group may have an alkyl group having 1 to 6 carbon atoms, an alkoxy group having 1 to 6 carbon atoms, an aryl group having 6 to 10 carbon atoms, an aryloxy group having 6 to 10 carbon atoms, an aralkyl group having 7 to 12 carbon atoms, or an aralkyloxy group having 7 to 12 carbon atoms as a substituent.

First, examples of a phosphorus compound represented by general formula (2) used as a raw material include dimethylphosphine oxide, diethylphosphine oxide, dibutylphosphine oxide, diphenylphosphine oxide, dibenzylphosphine oxide, cyclooctylenephosphine oxide, triphenylphosphine oxide, and bis(methoxyphenyl)phosphine oxide, phenyl phenylphosphinate, ethyl phenylphosphinate, tolyl tolylphosphinate, and benzyl benzylphosphinate, DOPO, 8-methyl-9,10-dihydro-9-oxa-10-phosphaphenanthrene-10-oxide, 8-benzyl-9,10-dihydro-9-oxa-10-phosphaphenanthrene-10-oxide, 8-phenyl-9,10-dihydro-9-oxa-10-phosphaphenanthrene-10-oxide, 2,6,8-tributyl-9,10-dihydro-9-oxa-10-phosphaphenanthrene-10-oxide, and 6,8-dicyclohexyl-9,10-dihydro-9-oxa-10-phosphaphenanthrene-10-oxide, and diphenyl phosphonate, ditolyl phosphate, dibenzyl phosphonate, and 5,5-dimethyl-1,3,2-dioxaphosphorinane, but the present invention is not limited thereto. These phosphorus compounds may be used alone or two or more thereof may be used in combination.

In addition, examples of a phosphorus compound represented by general formula (1) used as a raw material include 10-(2,5-dihydroxyphenyl)-10H-9-oxa-10-phosphaphenanthrene-10-oxide (DOPO-HQ), 10-[2-(dihydroxynaphthyl)]-9,10-dihydro-9-oxa-10-phosphaphenanthrene-10-oxide (DOPO-NQ), diphenylphosphinyl hydroquinone, diphenylphosphinyl-1,4-dioxynaphthalene, 1,4-cyclooctylenephosphinyl-1,4-phenyldiol, and 1,5-cyclooctylene phosphinyl-1,4-phenyldiol. These phosphorus compounds may be used alone or two or more thereof may be used in combination, and the present invention is not limited thereto.

The novolac epoxy resin is generally a multifunctional novolac epoxy resin obtained by reacting a novolac phenolic resin which is a condensation reaction product of phenols and aldehydes with an epihalohydrin such as epichlorohydrin and is represented by the following general formula (3).

Examples of phenols used include phenol, cresol, ethylphenol, butylphenol, styrenated phenol, cumylphenol, naphthol, catechol, resorcinol, naphthalene diol, and bisphenol A, and examples of aldehydes include formalin, formaldehyde, hydroxybenzaldehyde, and salicylaldehyde. In addition, an aralkyl type phenolic resin in which xylylene methanol, xylylene chloride, bischloromethylnaphthalene, or bischloromethylbiphenyl is used in place of aldehydes is also included in the novolac phenolic resin in the present invention.

[Chem. 2]

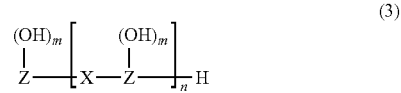

(3)

In general formula (3), Z represents an aromatic ring group selected from among a benzene ring, a naphthalene ring, a biphenyl ring, and a bisphenyl structure. These aromatic ring groups may have an alkyl group having 1 to 6 carbon atoms, an alkoxy group having 1 to 6 carbon atoms, an aryl group having 6 to 10 carbon atoms, an aryloxy group having 6 to 10 carbon atoms, an aralkyl group having 7 to 12 carbon atoms, or an aralkyloxy group having 7 to 12 carbon atoms. X represents a divalent aliphatic cyclichydrocarbon group or a crosslinking group represented by the following Formula (3a) or Formula (3b). n represents a number of 1 to 10. m represents an integer of 1 to 3.

[Chem. 3]

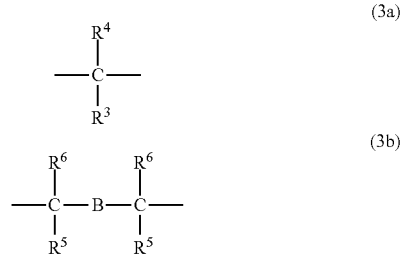

In Formulae (3a) and (3b), $R^3$, $R^4$, $R^5$ and $R^6$ each independently represent a hydrogen atom or a hydrocarbon group having 1 to 6 carbon atoms. B represents an aromatic ring group selected from among a benzene ring, a naphthalene ring and a biphenyl ring, and these aromatic ring groups may have an alkyl group having 1 to 6 carbon atoms, an alkoxy group having 1 to 6 carbon atoms, an aryl group having 6 to 10 carbon atoms, an aryloxy group having 6 to 10 carbon atoms, an aralkyl group having 7 to 12 carbon atoms, or an aralkyloxy group having 7 to 12 carbon atoms.

The number of carbon atoms of the divalent aliphatic cyclichydrocarbon group is preferably 5 to 15 and more preferably 5 to 10. Here, examples of divalent aliphatic cyclichydrocarbon groups include a divalent aliphatic cyclichydrocarbon group derived from an unsaturated cyclic aliphatic hydrocarbon compound such as dicyclopentadiene, tetrahydroindene, 4-vinylcyclohexene, 5-vinyl norbona-2-ene, α-pinene, β-pinene, and limonene.

Specific examples of general novolac epoxy resins include phenol novolac epoxy resins (for example, Epototo YDPN-638 (commercially available from NIPPON STEEL Chemical & Material Co., Ltd.), jER152, jER154 (all are commercially available from Mitsubishi Chemical Corporation), Epiclon N-740, N-770, N-775 (all are commercially available from DIC Corporation), etc.), cresol novolac epoxy resins (for example, Epototo YDCN-700 series (commercially available from NIPPON STEEL Chemical & Material Co., Ltd.), Epiclon N-660, N-665, N-670, N-673, N-695 (all are commercially available from DIC Corporation), EOCN-1020, EOCN-1025, EOCN-1045 (all are commercially available from Nippon Kayaku Co., Ltd.), etc.), alkyl novolac epoxy resins (for example, Epototo ZX-1071T, ZX-1270, ZX-1342 (all are commercially available from NIPPON STEEL Chemical & Material Co., Ltd.), etc.), aromatically modified phenol novolac epoxy resins (for example, Epototo ZX-1247, GK-5855, TX-1210, YDAN-1000 (all are commercially available from NIPPON STEEL Chemical & Material Co., Ltd.), etc.), bis phenol novolac epoxy resins, naphthol novolac epoxy resins (for example, Epototo ZX-1142L (commercially available from NIPPON STEEL Chemical & Material Co., Ltd.), etc.), 3-naphthol aralkyl type epoxy resins (for example, ESN-155, ESN-185V, ESN-175 (all are commercially available from NIPPON STEEL Chemical & Material Co., Ltd.), etc.), naphthalenediol aralkyl type epoxy resins (for example, ESN-300 series, ESN-355, ESN-375 (all are commercially available from NIPPON STEEL Chemical & Material Co., Ltd.), etc.), α-naphthol aralkyl type epoxy resins (for example, ESN-400 series, ESN-475V, ESN-485 (all are commercially available from NIPPON STEEL Chemical & Material Co., Ltd.), etc.), biphenyl aralkylphenol type epoxy resins (for example, NC-3000, NC-3000H (all are commercially available from Nippon Kayaku Co., Ltd.), etc.), tri-hydroxyphenylmethane type epoxy resins (for example, EPPN-501, EPPN-502 (all are commercially available from Nippon Kayaku Co., Ltd.), etc.), and dicyclopentadiene type epoxy resins (for example, Epiclon HP7200, HP-7200H (all are commercially available from DIC Corporation), etc.). However, generally, these epoxy resins do not have a specific molecular weight distribution which is a characteristic of a novolac epoxy resin used in the present invention and have an average number of functional groups that is outside of the range thereof.

In order to obtain a novolac epoxy resin having a specific molecular weight distribution and a specific average number of functional groups used in the present invention, a novolac phenolic resin obtained by reacting phenols with aldehydes in the presence of an acid catalyst is used as a starting raw material. These reaction methods may be, for example, known methods obtained as production methods as shown in Japanese Patent Application Publication No. 2002-194041, Japanese Patent Application Publication No. 2007-126683, and Japanese Patent Application Publication No. 2013-107980, and are not particularly limited.

In these obtained starting raw materials, after the low-molecular-weight content mainly composed of dinuclear bodies is removed or the content is reduced to 10 area % or less by various methods such as distillation, condensation with aldehydes is additionally performed again in the presence of an acid catalyst to reduce the amount of dinuclear bodies, and adjustment is performed to increase the proportion of hepta or higher nuclear bodies. Since the novolac epoxy resin is epoxidized in consideration of the molecular weight distribution of the novolac phenolic resin, in the obtained novolac epoxy resin, the content of respective nuclear bodies that is adjusted in the same manner is obtained.

Here, in this specification, the "content" of each nuclear body in the novolac epoxy resin is an "area %" measured by GPC and may be expressed as content or area %. In addition, the content of the hepta or higher nuclear bodies and the content of trinuclear bodies may be simply expressed as "H" and "L", respectively. Here, in the novolac epoxy resin represented by general formula (3), n is 2 in the trinuclear body, and n is 6 or more in the hepta or higher nuclear bodies.

In production of novolac phenolic resins, regarding the molar ratio of phenols to aldehydes, the molar ratio of phenols to 1 mol of aldehydes is adjusted for production. Generally, when the molar ratio of phenols used is large, a large amount of dinuclear bodies and then trinuclear bodies are produced, and as the molar ratio of phenols used decreases, a large amount of high-molecular-weight polynuclear bodies is produced, and on the contrary, the amount of dinuclear bodies and trinuclear bodies decreases.

In general novolac phenolic resins in which the low molecular content is not removed, in order to increase the number of functional groups, it is general to reduce the above molar ratio of phenols to 1 mol of aldehydes and increase the degree of condensation. In the case of this production method, the dispersion (Mw/Mn) of the molecular weight distribution of the obtained novolac phenolic resin becomes wide, and the value of the number average molecular weight (Mn) decreases due to the influence of the amount of the remaining dinuclear bodies. On the other hand, the increase in the content (area %) of hepta or higher nuclear bodies measured by GPC becomes significantly large. In addition, when this novolac phenolic resin is epoxidized, since the epoxy equivalent (E) also increases, the value of the average number of functional groups (Mn/E)

tends to decrease, and this resin is not suitable as an epoxy resin aiming for high heat resistance.

On the other hand, regarding tracking on a high-voltage circuit, a carbonized layer (char) is formed by scintillation generated by contaminants on the circuit surface layer, and this conductive layer leads to dielectric breakdown. The char formation here is a requirement that contradicts the halogen-free flame retardancy mechanism of the organic phosphorus compound. That is, for flame retardancy, it is desired to use a large amount of phosphorus compound to form a large amount of char, but on the contrary, it is necessary to reduce the amount of the phosphorus compound used that promotes char formation in order to increase tracking resistance. Therefore, in order to satisfy both requirements, another system that promotes flame retardancy is essential.

Regarding flame retardancy, since the dinuclear body of the novolac epoxy resin is a difunctional body, its involvement in the crosslinked structure in the cured product is weak, and there is a concern that it may have an adverse effect on flame retardancy due to its property of being highly thermally decomposable during ignition. Therefore, as one system that promotes flame retardancy, the low-molecular content mainly composed of dinuclear bodies is removed and condensation is additionally performed again, which are effective for flame retardancy.

On the other hand, as another system that promotes flame retardancy, a method of reducing the generation of a flammable decomposition gas to the outside is also known. For that purpose, it is preferable to minimize the modulus of elasticity of the cured product in a rubber-like area at a high temperature. However, a case in which a highly heat-resistant cured product tends to have a high modulus of elasticity at a high temperature due to its high crosslinking density, the vicinity of the non-flammable char formed after combustion becomes hard and brittle, and flame retardancy deteriorates is known.

Therefore, in careful consideration of the mechanism that promotes flame retardancy in both cases described above, a method of achieving multifunctionality by a method of reducing the amount of dinuclear bodies but not increasing the amount of large nuclear bodies too much has been extensively studied and as a result, it has been found that a method of achieving multifunctionality by performing recondensation using a raw material mainly composed of trinuclear bodies as a starting raw material after the amount of dinuclear bodies is reduced is effective for flame retardancy. That is, when the novolac epoxy resin in which the ratio (L/H) of the content (L) of trinuclear bodies to the content (H) of hepta or higher nuclear bodies is within a range of 0.6 to 4.0 is used as a raw material of the phosphorus-containing epoxy resin, even if the amount of the phosphorus compound used is reduced, a sufficient flame retardant effect can be exhibited from the resin itself.

When the phosphorus-containing epoxy resin obtained by the above method is used, it is possible to minimize the modulus of elasticity of the cured product of the phosphorus-containing epoxy resin composition in a high temperature range, and the flame retardancy is further improved. Specifically, in actual measurement using a dynamic viscoelasticity measuring device (DMA: measurement conditions of a heating rate of 2° C./min and a frequency of 1 Hz), the value of the storage elastic modulus stabilized at 220° C. or higher decreases, and thus a combustion part of a combustion test piece foams and fire extinguishing is promoted. The value of the modulus of elasticity is adjusted preferably to 150 MPa or less, and more preferably to 50 MPa or less. When the content of hepta or higher nuclear bodies increases, the crosslinking density of the cured product increases, the char in the vicinity of the combustion part becomes hard and brittle, and the flame retardancy deteriorates.

In the novolac epoxy resin which is a raw material of the phosphorus-containing epoxy resin used in the present invention, regarding a method of removing or reducing the amount of mainly dinuclear bodies in the novolac phenolic resin which is the raw material, a method of using the difference in solubility of various solvents, a method of dissolving dinuclear bodies in an alkaline aqueous solution and removing them, a method of removing dinuclear bodies by thin film distillation, and the like are known, and any of these separation methods may be used.

The novolac phenolic resin from which dinuclear bodies have been removed or in which the amount thereof has been reduced by the above method is condensed again with aldehydes to adjust the molecular weight distribution. The recondensation method may be a method of performing dissolution in an organic solvent such as toluene and isobutyl ketone, and then performing a reaction with aldehydes in the presence of an acid catalyst or performing the same reaction in a solvent-free molten state. Regarding acid catalysts, inorganic acids such as hydrochloric acid, sulfuric acid, and boric acid, and organic acids such as oxalic acid, acetic acid, benzenesulfonic acid, p-toluenesulfonic acid, xylenesulfonic acid, p-phenolsulfonic acid, methanesulfonic acid, and ethanesulfonic acid may be used alone or may be used in combination. In addition, aldehydes that are generally known can be used. Examples thereof include formaldehyde, paraformaldehyde, chloroacetaldehyde, dichloroacetaldehyde, bromoacetaldehyde, trioxane, acetaldehyde, glyoxal, acrolein, and methacrolein, and formaldehyde or paraformaldehyde is preferable in production of phenol novolac. In this case, the aldehydes may be used alone or two or more thereof may be used in combination. Regarding the method of adding the aldehydes or the like, a method according to a device such as a method of performing adding together with raw materials in the presence of an acid catalyst with a sufficient cooling device or a method of performing addition in a divided manner while checking the heat generation status as the reaction proceeds can be performed.

When the reaction occurs with an amount of aldehyde used in recondensation that is preferably 0.06 to 0.30 times, more preferably 0.08 to 0.15 times, and still more preferably 0.10 to 0.12 times the number of moles obtained by dividing the amount of the novolac phenolic resin added by the actual average molecular weight of the novolac phenolic resin, adjustment can be performed such that the most suitable nuclear bodies for the novolac epoxy resin can be prepared. Here, the "actual average molecular weight" is a molecular weight obtained by multiplying the area % of each nuclear body obtained by GPC measurement by each theoretical molecular weight and then performing cumulative averaging. If this weight is less than 0.06 times, the average number of functional groups of the phosphorus-containing epoxy resin is insufficient, and it is not possible to obtain heat resistance at 200° C. or higher. In addition, if this weight is more than 0.30 times, similarly, the average number of functional groups is excessively high, and it is not possible to obtain sufficient flame retardancy due to high elasticity of the cured product.

The epoxidation of the novolac phenolic resin obtained in this manner can be performed by a known method. For example, using 3 to 5 times the number of moles of epihalohydrin with respect to the number of moles of the hydroxy groups of the novolac phenolic resin, the reaction can be performed while a caustic soda aqueous solution is added dropwise at 60° C. to 70° C. for 2 hours under a reduced pressure of 100 to 200 torr (13.3 to 26.7 kPa).

In the novolac epoxy resin obtained by these methods, the ratio (L/H) of the area % (L) of trinuclear bodies to the area % (H) of hepta or higher nuclear bodies measured using GPC is within a range of 0.6 to 4.0, and the average number of functional groups (Mn/E) obtained by dividing the number average molecular weight (Mn) by the epoxy equivalent (E) is within a range of 3.8 to 4.8.

Here, when (L/H) exceeds 4.0, the amount of trinuclear bodies increases, the average number of functional groups is less than 3.8, the heat resistance of the cured product using the phosphorus-containing epoxy resin decreases, and a Tg of 200° C. or higher cannot be obtained. On the other hand, when (L/H) is less than 0.6, since the amount of hepta or higher nuclear bodies increases, and the amount of dinuclear bodies decreases, the cured product becomes hard and brittle, and the flame retardancy is greatly impaired.

The reaction for obtaining a phosphorus-containing epoxy resin from the phosphorus compound represented by general formula (1) and/or general formula (2) and the above novolac epoxy resin is performed by a known method. For example, as described in PTL 2, a method in which, after synthesis of general formula (1) and general formula (2) is performed, the novolac epoxy resin or the like is added to uniformize the mixture, triphenylphosphine or the like is then added as a catalyst, and the reaction is caused at 150° C. may be used.

In addition, a catalyst may be used for this reaction in order to shorten the time and lower the reaction temperature. The catalyst used is not particularly limited, and those generally used for synthesizing an epoxy resin can be used. Various catalysts, for example, tertiary amines such as benzyldimethylamine, quaternary ammonium salts such as tetramethylammonium chloride, phosphines such as triphenylphosphine and tris(2,6-dimethoxyphenyl)phosphine, phosphonium salts such as ethyltriphenylphosphonium bromide, and imidazoles such as 2-methylimidazole and 2-ethyl-4-methylimidazole can be used, and these catalysts may be used alone or two or more thereof may be used in combination, and the present invention is not limited thereto. In addition, the catalyst may be used several times in a divided manner.

Here, the amount of catalyst is not particularly limited, and it is preferably 5 mass % or less, more preferably 1 mass % or less, and still more preferably 0.5 mass % or less with respect to the phosphorus-containing epoxy resin (a total amount of raw material novolac epoxy resin and phosphorus compound). If the amount of catalyst is large, this is not preferable because the self-polymerization reaction of the epoxy group proceeds in some cases, and thus the viscosity of the resin becomes higher. In addition, when a preliminary reaction epoxy resin in which the reaction here is stopped on the way is used, if the amount of catalyst is set to 0.1 mass % or less, it is possible to easily adjust the reaction rate to 60 to 90%.

When the phosphorus compound represented by general formula (1) or general formula (2) is reacted with the novolac epoxy resin, as necessary, various epoxy resin modifying agents may be used in combination as long as the characteristics of the present invention are not impaired. Examples of modifying agents include various phenols such as bisphenol A, bisphenol F, bisphenol AD, tetrabutyl bisphenol A, hydroquinone, methyl hydroquinone, dimethyl hydroquinone, dibutyl hydroquinone, resorcin, methyl resorcin, biphenol, tetramethylbiphenol, 4,4'-(9-fluorenylidene)diphenol, dihydroxynaphthalene, dihydroxydiphenyl ether, dihydroxystilbenes, phenol novolac resins, cresol novolac resins, bisphenol A novolac resins, dicyclopentadiene phenolic resins, phenolaralkyl resins, naphthol novolac resins, terpene phenolic resins, heavy oil-modified phenolic resins, and brominated phenol novolac resins, multivalent phenolic resins obtained by a condensation reaction of various phenols and various aldehydes such as hydroxybenzaldehyde, crotonaldehyde, and glyoxal, and amine compounds such as aniline, phenylenediamine, toluidine, xylidine, diethyl toluene diamine, diaminodiphenylmethane, diaminodiphenylethane, diaminodiphenylpropane, diaminodiphenyl ketone, diaminodiphenyl sulfide, diaminodiphenyl sulfone, bis(aminophenyl)fluorene, diaminodiethyldimethyldiphenylmethane, diaminodiphenyl ether, diaminobenzanilide, diaminobiphenyl, dimethyldiaminobiphenyl, biphenyltetraamine, bisaminophenylanthracene, bisaminophenoxybenzene, bisaminophenoxyphenyl ether, bisaminophenoxybiphenyl, bisaminophenoxyphenyl sulfone, bisaminophenoxyphenylpropane, and diaminonaphthalene, and the present invention is not limited thereto, and two or more thereof may be used in combination.

In addition, an inactive solvent may be used for the reaction. Specifically, various hydrocarbons such as hexane, heptane, octane, decane, dimethylbutane, pentene, cyclohexane, methylcyclohexane, benzene, toluene, xylene, and ethylbenzene, various alcohols such as isopropyl alcohol, isobutyl alcohol, isoamyl alcohol, and methoxypropanol, ethers such as ethyl ether, isopropyl ether, butyl ether, diisoamyl ether, methyl phenyl ether, ethyl phenyl ether, amyl phenyl ether, ethyl benzyl ether, dioxane, methylfuran, and tetrahydrofuran, and methyl cellosolve, methyl cellosolve acetate, ethyl cellosolve, cellosolve acetate, ethylene glycol isopropyl ether, diethylene glycol dimethyl ether, methyl ethyl carbitol, propylene glycol monomethyl ether, dimethylformamide, dimethyl sulfoxide, and the like can be used, and the present invention is not limited thereto and two or more thereof may be used in combination.

The epoxy resin composition of the present invention can be cured with a conventionally known curing agent. Examples of curing agents include a phenolic resin-based curing agent, an acid anhydride-based curing agent, an amine-based curing agent and other curing agents which are generally used, and these curing agents may be used alone or two or more thereof may be used in combination. Among these, the curing agent of the curable epoxy resin composition of the present invention is preferably a dicyandiamide curing agent in consideration of imparting the heat resistance. In addition, a phenolic curing agent is preferable in consideration of the water absorption rate and imparting long-term thermal stability.

Regarding the amount of the curing agent used in the epoxy resin composition, the number of moles of active hydrogen groups of the curing agent with respect to 1 mol of epoxy groups in the total epoxy resin is within a range of 0.2 to 1.5 mol. When the number of moles of active hydrogen groups with respect to 1 mol of epoxy groups is less than 0.2 mol or more than 1.5 mol, there is a risk of curing becoming incomplete and favorable curing properties not being obtained. 0.3 to 1.5 mol is preferable, 0.5 to 1.5 mol is more preferable, and 0.8 to 1.2 mol is still more preferable. For example, when dicyandiamide is used, 0.4 to 0.7 mol, preferably 0.4 to 0.6 mol of active hydrogen groups of the curing agent with respect to 1 mol of epoxy groups is added, when a phenolic resin-based curing agent or an amine-based curing agent is used, approximately the same molar amount of active hydrogen groups as that of epoxy groups is added, and when an acid anhydride-based curing agent is used, 0.5 to 1.2 mol, preferably 0.6 to 1.0 mol of acid anhydride groups with respect to 1 mol of epoxy groups is added.

The active hydrogen group referred to in the present invention is a functional group having active hydrogen reactive with an epoxy group (including a functional group having latent active hydrogen that produces active hydrogen by hydrolysis or the like and a functional group exhibiting the same curing action), and specific examples thereof include an acid anhydride group, a carboxylic group, an amino group and a phenolic hydroxy group. Here, regarding the active hydrogen group, 1 mol of carboxylic groups or 1 mol of phenolic hydroxy groups, and 2 mol of amino groups ($NH_2$) are calculated. In addition, if the active hydrogen group is not clear, the active hydrogen equivalent can be determined by measurement. For example, the active hydrogen equivalent of the curing agent used can be determined by reacting a mono epoxy resin such as phenylglycidyl ether having a known epoxy equivalent with a curing agent having an unknown active hydrogen equivalent and measuring the amount of the mono epoxy resin consumed.

Specific examples of phenol-based curing agents include bisphenols such as bisphenol A, bisphenol F, bisphenol C, bisphenol K, bisphenol Z, bisphenol S, tetramethyl bisphenol A, tetramethyl bisphenol F, tetramethyl bisphenol S, tetramethyl bisphenol Z, dihydroxydiphenyl sulfide, bisphenol TMC, 4,4'-(9-fluorenilidene)diphenol, and 4,4'-thiobis (3-methyl-6-t-butylphenol), dihydroxybenzenes such as catechol, resorcin, methyl resorcin, hydroquinone, monomethylhydroquinone, dimethylhydroquinone, trimethylhydroquinone, mono-t-butylhydroquinone, and di-t-butylhydroquinone, hydroxynaphthalenes such as dihydroxynaphthalene, dihydroxymethylnaphthalene, and trihydroxynaphthalene, phosphorus-containing phenol curing agents such as LC-950PM60 (commercially available from Shin-AT&C), phenol novolac resins such as Shonol BRG-555 (commercially available from Aica Kogyo Co., Ltd.), cresol novolac resins such as DC-5 (commercially available from NIPPON STEEL Chemical & Material Co., Ltd.), trishydroxyphenylmethane type novolac resins such as aromatically modified phenol novolac resins, bisphenol A novolac resins, and Resitop TPM-100 (commercially available from Gun Ei Chemical Industry Co., Ltd.), phenols such as naphthol novolac resins, phenols such as naphthols, biphenols and/or condensates of bisphenols and aldehydes, SN-160, SN-395, SN-485 (all are commercially available from NIPPON STEEL Chemical & Material Co., Ltd.), phenol compounds that are so called a "novolac phenolic resin" such as naphthols, biphenols and/or condensates of bisphenols and xylylene glycol, phenols, naphthols, biphenols and/or condensates of bisphenols and isopropenyl acetophenone, phenols, naphthols, biphenols and/or reaction products of bisphenols and dicyclopentadiene, phenols, naphthols, biphenols and/or condensates of bisphenols and biphenyl-based condensing agents, and triazine ring- and hydroxyphenyl group-containing compounds such as PS-6313 (commercially available from Gun Ei Chemical Industry Co., Ltd.). In consideration of availability, phenol novolac resins, dicyclopentadiene type phenolic resins, tri shydroxyphenylmethane type novolac resins, aromatically modified phenol novolac resins and the like are preferable.

In the case of "novolac phenolic resin", examples of phenols include phenol, cresol, xylenol, butylphenol, amylphenol, nonylphenol, butylmethylphenol, trimethylphenol, and phenylphenol, examples of naphthols include 1-naphthol and 2-naphthol, and in addition, the above biphenols and bisphenols may be exemplified.

Examples of aldehydes include formaldehyde, acetaldehyde, propylaldehyde, butyraldehyde, valeraldehyde, capronaldehyde, benzaldehyde, chloraldehyde, bromaldehyde, glyoxal, malonaldehyde, succinaldehyde, glutaraldehyde, adipic aldehyde, pimerin aldehyde, sebacic aldehyde, acrolein, crotonaldehyde, salicylaldehyde, phthalaldehyde, and hydroxybenzaldehyde.

Examples of biphenyl-based condensing agents include bis(methylol)biphenyl, bis(methoxymethyl)biphenyl, bis(ethoxymethyl)biphenyl, and bis(chloromethyl)biphenyl.

Specific examples of acid anhydride-based curing agents include methyltetrahydrophthalic anhydride, hexahydrophthalic anhydride, pyromellitic anhydride, phthalic anhydride, trimellitic anhydride, and methylnadic anhydride.

Specific examples of amine-based curing agents include diethylene triamine, triethylenetetramine, m-xylylenediamine, isophoronediamine, diaminodiphenylmethane, diaminodiphenyl sulfone, diaminodiphenyl ether, benzyldimethylamine, 2,4,6-tris(dimethylaminomethyl)phenol, dicyandiamide, and amine compounds such as polyamide amines which are condensates of acids such as dimer acid and polyamines.

Specific examples of other curing agents include phosphine compounds such as triphenylphosphine, phosphonium salts such as tetraphenylphosphonium bromide, imidazoles such as 2-methylimidazole, 2-phenylimidazole, 2-ethyl-4-methylimidazole, 2-undecylimidazole, and 1-cyanoethyl-2-methylimidazole, imidazole salts which are salts of imidazoles with trimellitic acid, isocyanuric acid, or boric acid, amines such as benzyldimethylamine and 2,4,6-tris(dimethylaminomethyl)phenol, quaternary ammonium salts such as trimethylammonium chloride, diazabicyclo compounds, and salts of diazabicyclo compounds with phenols, phenol novolac resins or the like, complex compounds of boron trifluoride with amines, ether compounds or the like, aromatic phosphonium, iodonium salts, hydrazines, and acidic polyesters. In addition, an oxazine resin in which a phenolic hydroxy group is generated during curing can be used as a curing agent. Specific examples of oxazine resins include bisphenol F type benzooxazine compounds (for example, YBZ-2013 (commercially available from NIPPON STEEL Chemical & Material Co., Ltd.), F-a type (commercially available from Shikoku Chemicals Corporation), BF-BXZ (commercially available from Konishi Chemical Industry Co., Ltd.), LMB6493 (commercially available from Huntsman Corporation), etc.), bisphenol A type benzooxazine compounds (for example, XU3560CH (commercially available from Huntsman Corporation), etc.), bisphenol S type benzooxazine compounds (for example, BS-BXZ (commercially available from Konishi Chemical Industry Co., Ltd.), etc.), phenolphthalein type benzooxazine compounds (for example, LMB6490 (commercially available from Huntsman Corporation), etc.), and phenol novolac benzooxazine compounds (for example, YBZ-2213 (commercially available from NIPPON STEEL Chemical & Material Co., Ltd.), and the present invention is not limited thereto.

In the epoxy resin composition of the present invention, as necessary, an epoxy resin other than the above phosphorus-containing epoxy resin may be used in combination. Examples of epoxy resins that can be used in combination include polyglycidyl ether compounds, polyglycidyl amine compounds, polyglycidyl ester compounds, alicyclic epoxy compounds, and other modified epoxy resins, and the present invention is not limited thereto, and these epoxy resins may be used alone or two or more thereof may be used in combination. When an epoxy resin is used in combination, it is preferably 50 mass % or less and more preferably 30 mass % or less of the total epoxy resin. If the amount of the epoxy resin used in combination is too large, there is a risk of an effect of achieving both heat resistance and flame retardancy not being obtained.

Examples of epoxy resins that can be used in combination include bisphenol A type epoxy resins, bisphenol F type epoxy resins, tetramethyl bisphenol F type epoxy resins, hydroquinone type epoxy resins, biphenyl type epoxy resins, bisphenol fluorene type epoxy resins, bisphenol S type epoxy resins, bisthioether type epoxy resins, resorcinol type epoxy resins, biphenyl aralkylphenol type epoxy resins, naphthalene diol type epoxy resins, phenol novolac epoxy resins, aromatically modified phenol novolac epoxy resins, cresol novolac epoxy resins, alkyl novolac epoxy resins, bis phenol novolac epoxy resins, naphthol novolac epoxy resins, β-naphthol aralkyl type epoxy resins, dinaphthol aralkyl type epoxy resins, α-naphthol aralkyl type epoxy resins, trisphenylmethane type epoxy resins, dicyclopentadiene type epoxy resins, alkylene glycol type epoxy resins, aliphatic cyclic epoxy resins, diaminodiphenylmethane tetraglycidyl amine, amino phenol type epoxy resins, urethane modified epoxy resins, and oxazoridone ring-containing epoxy resins, and the present invention is not limited thereto.

In addition, in the epoxy resin composition of the present invention, a known reaction retarder can be used for adjusting curability. For example, boric acid, boric acid ester, phosphoric acid, alkyl phosphate ester, p-toluene sulfonic acid, or the like can be used.

Examples of boric acid esters include tributylborate, trimethoxyboroxin, ethyl borate, and epoxy-phenol-boric acid ester formulation (for example, Cureduct L-07N (commercially available from Shikoku Chemicals Corporation), etc.), and examples of alkyl phosphate esters include trimethyl phosphate and tributyl phosphate.

Reaction retarders may be used alone or a plurality thereof may be used in combination, and they are preferably used alone in consideration of ease of adjustment of the amount used, and the effect is most favorable when a particularly small amount of boric acid is used. When a reaction retarder is used, it can be dissolved in an alcohol-based solvent such as methanol, butanol, or 2-propanol, and used at a concentration of 5 to 20 mass %. In particular, when the curing agent is dicyandiamide, 0.1 to 0.5 mol of boric acid with respect to 1 mol of the curing agent is preferable, and 0.15 to 0.35 mol of boric acid is more preferable in order to obtain the retarding effect and heat resistance. In addition, when the curing agent is a phenol-based curing agent, it is preferably 0.1 to 5 parts by mass with respect to the phosphorus-containing epoxy resin, and more preferably 0.1 to 1 parts by mass in order to obtain heat resistance. In particular, when the amount of boric acid used increases to 5 parts by mass or more, this is not preferable because it is necessary to adjust curability and increase the amount of a reaction promoting agent such as imidazole, and the insulation reliability of the cured product is significantly impaired.

In the epoxy resin composition, as necessary, a curing accelerator can be used. Examples thereof include imidazoles such as 2-methylimidazole, 2-ethyl imidazole, and 2-ethyl-4-methylimidazole, tertiary amines such as 2-(dimethylaminomethyl)phenol, and 1,8-diazabicyclo (5,4,0)undec-7, phosphines such as triphenylphosphine, tricyclohexylphosphine, and triphenylphosphine triphenylborane, and metal compounds such as tin octylate. 0.02 to 5.0 parts by mass of the curing accelerator with respect to 100 parts by mass of the epoxy resin in the epoxy resin composition is used as necessary. When the curing accelerator is used, it is possible to lower the curing temperature and shorten the curing time.

For the epoxy resin composition, an organic solvent or a reactive diluent can be used for adjusting the viscosity.

Examples of organic solvents include amides such as N,N-dimethylformamide and N,N-dimethylacetamide, ethers such as ethylene glycol monomethyl ether, dimethoxydiethylene glycol, ethylene glycol diethyl ether, diethylene glycol diethyl ether, and triethylene glycol dimethyl ether, ketones such as acetone, methyl ethyl ketone methyl, isobutyl ketone, and cyclohexanone, alcohols such as methanol, ethanol, 1-methoxy-2-propanol, 2-ethyl-1-hexanol, benzyl alcohol, ethylene glycol, propylene glycol, butyl diglycol, and pine oil, acetic acid esters such as butyl acetate, methoxybutyl acetate, methyl cellosolve acetate, cellosolve acetate, ethyl diglycol acetate, propylene glycol monomethyl ether acetate, carbitol acetate, and benzyl alcohol acetate, benzoic acid esters such as methyl benzoate and ethyl benzoate, cellosolves such as methyl cellosolve, cellosolve, and butyl cellosolve, carbitols such as methyl carbitol, carbitol, and butyl carbitol, aromatic hydrocarbons such as benzene, toluene, and xylene, and dimethyl sulfoxide, acetonitrile, and N-methylpyrrolidone, and the present invention is not limited thereto.

Examples of reactive diluents include monofunctional glycidyl ethers such as allyl glycidyl ether, butyl glycidyl ether, 2-ethylhexyl glycidyl ether, phenylglycidyl ether, and tolyl glycidyl ether, bifunctional glycidyl ethers such as resorcinol diglycidyl ether, neopentyl glycol diglycidyl ether, 1,4-butanediol diglycidyl ether, 1,6-hexanediol diglycidyl ether, cyclohexane dimethanol diglycidyl ether, and propylene glycol diglycidyl ether, multifunctional glycidyl ethers such as glycerolpolyglycidyl ether, trimethylolpropane polyglycidyl ether, trimethylolethane polyglycidyl ether, and pentaerythritol polyglycidyl ether, glycidyl esters such as neodecanoic acid glycidyl ester, and glycidyl amines such as phenyl diglycidyl amine and tolyl diglycidyl amine, and the present invention is not limited thereto.

These organic solvents or reactive diluents are preferably used alone or in combination in an amount of 90 mass % or less in terms of the non-volatile content, and the appropriate type and amount used are appropriately selected depending on applications. For example, for printed wiring board applications, a polar solvent having a boiling point of 160° C. or lower such as methyl ethyl ketone, acetone, and 1-methoxy-2-propanol is preferable, and the amount used is preferably 40 to 80 mass % in terms of the non-volatile content. In addition, for adhesive film applications, for example, ketones, acetic acid esters, carbitols, aromatic hydrocarbons, dimethylformamide, dimethylacetamide, N-methylpyrrolidone and the like are preferably used, and the amount used is preferably 30 to 60 mass % in terms of the non-volatile content.

In the epoxy resin composition, as necessary, an inorganic filler can be used. Specific examples thereof include inorganic fillers such as fused silica, crystalline silica, alumina, silicon nitride, aluminum hydroxide, magnesium hydroxide, talc, calcined talc, mica, clay, kaolin, boehmite, calcium carbonate, calcium silicate, calcium hydroxide, magnesium carbonate, barium carbonate, barium sulphate, titanium oxide, boron nitride, carbon, glass powder, and silica balloon, but a pigment and the like may be added. The purpose of using an inorganic filler is generally to improve impact resistance, but it is also to contribute to dimensional stability as a countermeasure against warpage of a substrate due to thermal expansion. In addition, metal hydroxides such as aluminum hydroxide, boehmite, and magnesium hydroxide may be used not only as a flame retardant aid but also for supplementing traking resistance. When the phosphorus content of the composition is reduced, it is effective in securing flame retardancy, but when a large amount thereof is used, the moldability of the substrate greatly deteriorates. In particular, if the blending amount is not 10 mass % or more, the impact resistance effect is weak, and on the other hand, when the blending amount exceeds 150 mass %, there is a risk of adhesiveness necessary for laminated plate applications decreasing and other molding properties such as drilling processability deteriorating. In addition, as necessary, fibrous fillers such as glass fibers, carbon fibers, alumina fibers, silica aluminum fibers, silicon carbide fibers, polyester fibers, cellulose fibers, and aramid fibers, and organic fillers such as fine particle rubber and thermoplastic elastomers can also be used in combination as long as the characteristics of the present invention are not impaired.

In the epoxy resin composition, other thermosetting resins and thermoplastic resins may be added as long as the characteristics are not impaired. Examples thereof include phenolic resins, acrylic resins, petroleum resins, indene resins, coumarone indene resins, phenoxy resins, polyurethane resins, polyester resins, polyamide resins, polyimide resins, polyamideimide resins, polyetherimide resins, polyphenylene ether resins, modified polyphenylene ether resins, polyether sulfone resins, polysulfone resins, polyetheretherketone resins, polyphenylene sulfide resins, and polyvinyl formal resins, and the present invention is not limited thereto.

In addition, in the epoxy resin composition, various known flame retardants can be used in combination in order to improve flame retardancy of the obtained cured product. Examples of flame retardants that can be used in combination include phosphorus flame retardants, nitrogen flame retardants, silicone flame retardants, inorganic flame retardants, and organometallic salt-based flame retardants, and phosphorus flame retardants are particularly preferable. These flame retardants may be used alone or two or more thereof may be used in combination.

Regarding the phosphorus flame retardant, either an inorganic phosphorus compound or an organophosphorus compound can be used. Examples of inorganic phosphorus compounds include ammonium phosphates such as red phosphorus, monoammonium phosphate, diammonium phosphate, triammonium phosphate, and ammonium polyphosphate, and inorganic nitrogen-containing phosphorus compounds such as phosphate amide. Examples of organophosphorus compounds include general-purpose organophosphorus compounds such as condensed phosphate esters such as aliphatic phosphate, phosphate compounds, for example, PX-200 (commercially available from Daihachi Chemical Industry Co., Ltd.), and phosphonate compounds, phosphinate compounds, phosphine oxide compounds, phosphorane compounds, and organic nitrogen-containing phosphorus compounds such as phosphazen, and in addition to metal salts of phosphinic acid, cyclic organic phosphorus compounds such as DOPO, DOPO-HQ, and DOPO-NQ, phosphorus-containing epoxy resins and phosphorus-containing curing agents, which are derivatives obtained by reacting them with compounds such as epoxy resins and phenolic resins. In addition, when the phosphorus flame retardant is used, a flame retardant aid such as magnesium hydroxide may be used in combination.

A cured product can be obtained by curing the epoxy resin composition of the present invention. During curing, for example, a laminated plate can be obtained by laminating, heating, pressing and curing forms of a resin sheet, a resin-coated copper foil, a prepreg, or the like.

When the epoxy resin composition is used for a plate-like substrate or the like, a fibrous substrate is preferably exemplified as a filler in consideration of its dimensional stability, bending strength, and the like. More preferably, a glass fiber substrate in which glass fibers are woven in a mesh form is exemplified.

In the epoxy resin composition, as necessary, various additives such as a silane coupling agent, an antioxidant, a mold release agent, an anti-foaming agent, an emulsifier, a thixotropy-imparting agent, and a smoothing agent can be additionally added. The amount of these additives is preferably within a range of 0.01 to 20 mass % with respect to the epoxy resin composition.

When the epoxy resin composition is impregnated into a fibrous substrate, a prepreg used in a printed wiring board or the like can be prepared. Regarding the fibrous substrate, a woven fabric or non-woven fabric of inorganic fibers such as glass or organic fibers such as a polyester resin, a polyamine resin, a polyacrylic resin, a polyimide resin, and an aromatic polyimide resin can be used, and the present invention is not limited thereto. A method of producing a prepreg from an epoxy resin composition is not particularly limited. For example, an epoxy resin composition is immersed in a resin varnish prepared by adjusting the viscosity in a solvent and impregnated, and then heated and dried to obtain a semi-cured (B-stage) resin component, and for example, heating and drying can be performed at 100° C. to 200° C. for 1 to 40 minutes. Here, the amount of the resin in the prepreg is preferably 30 to 80 mass % in terms of the resin content.

In addition, in order to cure a prepreg, a method of curing a laminated plate generally used when a printed wiring board is produced can be used, and the present invention is not limited thereto. For example, when a laminated plate is formed using a prepreg, one or a plurality of prepregs are laminated, a metal foil is disposed on one side or both sides to form a laminate, the laminate is heated and pressurized to integrate the laminate. Here, regarding the metal foil, copper, aluminum, brass, nickel alone, an alloy, or a composite metal foil can be used. Then, the prepared laminate is pressurized and heated to cure the prepreg, and thereby a laminated plate can be obtained. In this case, preferably, the heating temperature is set to 160° C. to 220° C., the pressurizing pressure is set to 50 to 500 $N/cm^2$, and the heating and pressurizing time is set to 40 to 240 minutes, and a desired cured product can be obtained. If the heating temperature is low, the curing reaction does not proceed sufficiently, and if the heating temperature is high, there is a risk of decomposition of the epoxy resin composition starting. In addition, if the pressurizing pressure is low, bubbles may remain inside the obtained laminated plate, and electrical characteristics may deteriorate, and if the pressurizing pressure is high, the resin may flow before curing, and there is a risk of a cured product with a desired thickness not being obtained. In addition, if the heating and pressurizing time is short, there is a risk of the curing reaction not proceeding sufficiently, and if the heating and pressurizing time is long, this is not preferable because there is a risk of thermal decomposition of the epoxy resin composition in the prepreg occurring.

The epoxy resin composition can be cured in the same method as a known epoxy resin composition to obtain an epoxy resin cured product. Regarding a method for obtaining a cured product, the same method for a known epoxy resin composition can be used, and methods such as casting, injection, potting, dipping, drip coating, transfer molding, and compression molding, and forming a laminated plate by laminating forms of a resin sheet, a resin-coated copper foil, a prepreg or the like and heating, pressurizing, and curing them are preferably used. In this case, the curing temperature is generally within a range of 100° C. to 300° C., and the curing time is generally about 1 hour to 5 hours.

An epoxy resin composition using a phosphorus-containing epoxy resin was prepared, and a laminated plate obtained by heating and curing was evaluated, and as a result, a phosphorus-containing epoxy resin obtained by reacting a specific phosphorus compound with a novolac epoxy resin having a specific molecular weight distribution and a specific average number of functional groups exhibited higher heat resistance and flame retardancy than a conventionally known phosphorus-containing epoxy resin, and moreover, it was possible to improve tracking resistance, and it was possible to provide an epoxy resin composition that can improve physical properties of the cured product.

EXAMPLES

While the present invention will be described below in detail with reference to examples and comparative examples, the present invention is not limited thereto. Unless otherwise specified, "parts" represents parts by mass, and "%" represents mass %. Regarding measurement methods, the following methods were used for measurement. The unit of equivalent is "g/eq".

Epoxy equivalent: measured according to JIS K 7236. Specifically, using an automatic potentiometric titration device (COM-1600ST commercially available from Hiranuma Sangyo Co., Ltd.), chloroform was used as a solvent, a tetraethylammonium bromide acetic acid solution was added, and titration was performed with a 0.1 mol/L perchloric acid-acetic acid solution.

Phosphorus content: 3 mL of sulfuric acid was added to 150 mg of a sample and heating was performed for 30 minutes. The temperature was returned to room temperature, and 3.5 mL of nitric acid and 0.5 mL of perchloric acid were added and the mixture was heated and decomposed until the content became transparent or yellow. This solution was diluted with water in a 100 mL volumetric flask. 10 mL of this sample solution was put into a 50 mL volumetric flask, 1 drop of a phenolphthalein indicator was added, 2 mol/L ammonia water was added until it turned slightly red, 2 mL of a 50% sulfuric acid solution was added, and water was added. 5 mL of a 2.5 g/L ammonium metavanadate aqueous solution and 5 mL of a 50 g/L ammonium molybdate aqueous solution were added, and the volume was then adjusted with water. After the sample was left at room temperature for 40 minutes, measurement was performed using a spectrophotometer under conditions of a wavelength of 440 nm using water as a control. A calibration curve was created in advance with a potassium dihydrogen phosphate aqueous solution, and the phosphorus content was determined from the absorbance.

Glass transition temperature (Tg): expressed as the temperature of DSC-Tgm (intermediate temperature of a variation curve with respect to the tangent line between the glass state and the rubber state) when measurement was performed using a differential scanning calorimetry (commercially available from Hitachi High-Tech Science Corporation, EXSTAR6000 DSC6200) under heating conditions of 20° C./min.

Copper foil peeling strength and interlayer adhesion: measured according to JIS C 6481, 5.7. The interlayer adhesion was measured by peeling off between the 7th layer and 8th layer prepregs.

Flame retardancy and flame time: according to UL94 (safety certification standard of Underwriters Laboratories Inc.), 5 test pieces were tested and evaluated according to the vertical method. Flame retardancy was evaluated as V-0, V-1, and V-2. The flame time was expressed as a time (seconds) of the total flame combustion duration after the first and second flame applications (two flame applications for 5 test pieces with a total of 10 flame applications).

Trinuclear body, hepta or higher nuclear body, number average molecular weight (Mn): determined by GPC measurement. Specifically, columns (TSKgelG4000H$_{XL}$, TSKgelG3000H$_{XL}$, TSKgelG2000H$_{XL}$ commercially available from Tosoh Corporation) provided in series in a main body (HLC-8220GPC commercially available from Tosoh Corporation) were used, and the column temperature was set to 40° C. In addition, THF was used as an eluent, the flow rate was set to 1 mL/min, and an RI (differential refractometer) detector was used as the detector. For the measurement sample, 0.05 g of a sample was dissolved in 10 mL of THF, and filtration was performed through a micro filter, and 50 µL of the sample was used. For data processing, GPC-8020 Model II Version 6.00 (commercially available from Tosoh Corporation) was used. For the trinuclear body and the hepta or higher nuclear body, the area % of the peak was used, and Mn was converted from a calibration curve obtained from standard monodisperse polystyrene (A-500, A-1000, A-2500, A-5000, F-1, F-2, F-4, F-10, F-20, F-40 commercially available from Tosoh Corporation).

Tracking resistance: measured according to JIS C 2134. Specifically, a tracking resistance tester (HAT-112-3 commercially available from Yamayoshikenki Co., Ltd.) was used. A measurement sample (a laminated plate with a thickness of 1.6 mm) was cut to 20 mm×20 mm, and subjected to pre-test adjustment for 48 hours at 23±2° C. and a humidity of 50±5%, and a test was then performed with two pieces that were laminated such that the sample thickness was 3 mm or more under a test environment of 23±2° C. and a humidity of 50±5%. 100 drops of a 0.1% ammonium chloride aqueous solution were confirmed for 5 test pieces, and the maximum voltage value in which all of them were satisfactory was used as a test result.

Synthesis Example 1

1,000 parts of phenol was put into a 4-neck glass separable flask including a stirrer, a temperature regulating device, a reflux cooler, a total condenser, and a pressure reducing device, the temperature was raised to 80° C., 2.8 parts of oxalic acid dihydrate was then added, and the mixture was stirred and dissolved, and 142 parts of 37.5% formalin was added dropwise for 30 minutes. Then, the reaction temperature was maintained at 92° C., and the reaction was performed for 3 hours. After the reaction was completed, the temperature was raised to 110° C., water was removed, and about 90% of the remaining phenol was then collected under collection conditions of 150° C. and 60 mmHg, collection was then performed under collection conditions of 5 mmHg, 10 parts of water was then added dropwise for 90 minutes under conditions of 160° C. and 80 mmHg, the remaining phenol was removed, and nitrogen gas was then bubbled in the molted phenol novolac resin for 60 minutes to obtain a phenol novolac resin (N0).

In the obtained N0, some of dinuclear bodies were additionally distilled and removed using a thin film distiller at 280° C. and 5 mmHg to obtain a phenol novolac resin (N1). The obtained N1 had a softening point of 65° C., a dinuclear body of 10.8 area %, a trinuclear body of 52.9 area %, a tetranuclear body of 21.8 area %, a pentanuclear body of 8.5 area %, a hexanuclear body of 6.0 area %, and an actual average molecular weight of 355.

Synthesis Example 2

Using the N0 obtained in Synthesis Example 1, some of dinuclear bodies were more strongly distilled and removed using a thin film distiller at 300° C. and 5 mmHg to obtain a phenol novolac resin (N2). The obtained N2 had a softening point of 66° C., a dinuclear body of 5.9 area %, a trinuclear body of 58.4 area %, a tetranuclear body of 22.9 area %, a pentanuclear body of 8.3 area %, a hexanuclear body of 4.6 area %, and an actual average molecular weight of 356.

Synthesis Example 3

1,000 parts of N1 obtained in Synthesis Example 1 and 0.38 parts of oxalic acid dihydrate were put into a 4-neck glass separable flask including a stirrer, a temperature regulating device, a reflux cooler, a total condenser, a nitrogen gas introducing device, a pressure reducing device and a dripping device, stirring was performed while introducing nitrogen gas, heating was performed to raise the temperature. Dropwise addition of 13.5 parts of 37.5% formalin started at 80° C. and dropwise addition was completed in 30 minutes. Then, the reaction temperature was maintained at 92° C., the reaction occurred for 3 hours, then the temperature raised to 110° C., and reaction product water was removed outside of the system. Finally, heating was performed at 160° C. for 2 hours to obtain a phenol novolac resin (N3). The obtained N3 had a softening point of 63° C., a dinuclear body of 9.4 area %, a trinuclear body of 48.1 area %, a hepta or higher nuclear body of 9.0 area %, and an Mn of 552.

Then, 500 parts of N3, 2,200 parts of epichlorohydrin, and 400 parts of diethylene glycol dimethyl ether were put into the same device, and dissolved at 60° C., and while the temperature was maintained at 58° C. to 62° C. under a reduced pressure of 130 mmHg, 332 parts of a 49% caustic soda aqueous solution was added dropwise for 2 hours. During this time, epichlorohydrin was azeotroped with water, distillation was performed, and water was sequentially removed outside the system. Then, the reaction was continued for 2 hours under the same conditions. After the reaction was completed, epichlorohydrin was collected at 5 mmHg and 150° C., 1,200 parts of MIBK was added, and the product was dissolved. Then, 70 parts of a 10% sodium hydroxide aqueous solution was added, the reaction was caused at 80° C. to 90° C. for 2 hours, 1,000 parts of water was added, the by-product saline was dissolved and left, and the underlying saline solution was separated and removed. After neutralization with a phosphoric acid aqueous solution, the resin solution was washed with water until the washing solution became neutral, and refluxed and dehydrated, and then filtered to remove impurities. Then, the temperature was raised to 150° C. under a reduced pressure of 5 mmHg, and MIBK was distilled off to obtain a phenol novolac epoxy resin (E1). FIG. 1 shows the GPC measurement chart of E1. The horizontal axis represents the elution time (minutes), and the vertical axis represents detection intensity (mV). The peak indicated by A represent the trinuclear body and the peak group indicated by B represent the hepta or higher nuclear body.

Synthesis Example 4

A phenol novolac resin (N4) was obtained in the same manner as in Synthesis Example 3 except that 1,000 parts of N1, 0.63 parts of oxalic acid dihydrate, and 22.5 parts of 37.5% formalin were used. The obtained N4 had a softening point of 69° C., a dinuclear body of 8.0 area %, a trinuclear body of 43.7 area %, a hepta or higher nuclear body of 14.2 area %, and an Mn of 574. Then, N4 was epoxidized in the same manner as in Synthesis Example 3 to obtain a phenol novolac epoxy resin (E2).

Synthesis Example 5

A phenol novolac resin (N5) was obtained in the same manner as in Synthesis Example 3 except that 1,000 parts of N1, 1.89 parts of oxalic acid dihydrate, and 67.6 parts of 37.5% formalin were used. The obtained N5 had a softening point of 78° C., a dinuclear body of 7.2 area %, a trinuclear body of 31.2 area %, a hepta or higher nuclear body of 30.9 area %, and an Mn of 690. Then, N5 was epoxidized in the same manner as in Synthesis Example 3 to obtain a phenol novolac epoxy resin (E3).

Synthesis Example 6

A phenol novolac resin (N6) was obtained in the same manner as in Synthesis Example 3 except that 1,000 parts of N2, 0.63 parts of oxalic acid dihydrate, and 22.5 parts of 37.5% formalin were used. The obtained N6 had a softening point of 70° C., a dinuclear body of 5.1 area %, a trinuclear body of 45.8 area %, a hepta or higher nuclear body of 14.4 area %, and an Mn of 589. Then, N6 was epoxidized in the same manner as in Synthesis Example 3 to obtain a phenol novolac epoxy resin (E4).

Synthesis Example 7

A phenol novolac resin (N7) was obtained in the same manner as in Synthesis Example 3 except that 1,000 parts of LV-70S (commercially available from Gun Ei Chemical Industry Co., Ltd., a phenol novolac resin, with a softening point of 65° C., a dinuclear body of 1.0 area %, a trinuclear body of 74.7 area %, a tetranuclear body of 18.1 area %, a pentanuclear body of 6.2 area %, and an actually measured number average molecular weight of 337), 0.66 parts of oxalic acid dihydrate, and 23.7 parts of 37.5% formalin were used. The obtained N7 had a softening point of 67° C., a dinuclear body of 1.1 area %, a trinuclear body 57.3 area %, and it was difficult to separate the hexanuclear body and the heptanuclear body, and the content of the hexa or higher nuclear body was 22.0 area %, and the Mn was 580. Then, N7 was epoxidized in the same manner as in Synthesis Example 3 to obtain a phenol novolac epoxy resin (E5).

Synthesis Example 8

A phenol novolac resin (N8) was obtained in the same manner as in Synthesis Example 3 except that 1,000 parts of N1, 0.32 parts of oxalic acid dihydrate, and 11.3 parts of 37.5% formalin were used. The obtained N8 had a softening point of 62° C., a dinuclear body of 9.6 area %, a trinuclear body of 48.4 area %, a hepta or higher nuclear body of 7.7 area %, and an Mn of 545. Then, N8 was epoxidized in the same manner as in Synthesis Example 3 to obtain a phenol novolac epoxy resin (E6).

Synthesis Example 9

A phenol novolac resin (N9) was obtained in the same manner as in Synthesis Example 3 except that 1,000 parts of N1, 2.52 parts of oxalic acid dihydrate, and 90.1 parts of 37.4% formalin were used. The obtained N9 had a softening point of 84° C., a dinuclear body of 5.7 area %, a trinuclear body of 24.1 area %, a hepta or higher nuclear body of 41.5 area %, and an Mn of 748. Then, N9 was epoxidized in the same manner as in Synthesis Example 3 to obtain a phenol novolac type epoxy resin (E7).

Synthesis Example 10

YDPN-638 (phenol novolac epoxy resin, commercially available from NIPPON STEEL Chemical & Material Co., Ltd., an epoxy equivalent of 178) and YDF-170 (bisphenol F type liquid epoxy resin, commercially available from NIPPON STEEL Chemical & Material Co., Ltd., an epoxy equivalent of 168) were melted and mixed at 1/1 (mass ratio) to obtain a phenol novolac epoxy resin (E11).

The abbreviations for epoxy resins, curing agents, and other materials used are as follows.

[Epoxy Resin]

E1: Phenol novolac epoxy resin obtained in Synthesis Example 3 (an epoxy equivalent of 171, an Mn of 650, a trinuclear body of 40.6 area %, and a hepta or higher nuclear body of 20.9 area %)

E2: Phenol novolac epoxy resin obtained in Synthesis Example 4 (an epoxy equivalent of 172, an Mn of 682, a trinuclear body of 36.4 area %, and a hepta or higher nuclear body of 26.7 area %)

E3: Phenol novolac epoxy resin obtained in Synthesis Example 5 (an epoxy equivalent of 173, an Mn of 824, a trinuclear body of 26.1 area %, and a hepta or higher nuclear body of 42.2 area %)

E4: Phenol novolac epoxy resin obtained in Synthesis Example 6 (an epoxy equivalent of 174, an Mn of 693, a trinuclear body of 38.8 area %, and a hepta or higher nuclear body of 26.0 area %)

E5: Phenol novolac type epoxy resin obtained in Synthesis Example 7 (an epoxy equivalent of 173, an Mn of 669, a trinuclear body of 48.9 area %, and a hepta or higher nuclear body of 14.6 area %)

E6: Phenol novolac epoxy resin obtained in Synthesis Example 8 (an epoxy equivalent of 171, an Mn of 623, a trinuclear body of 41.9 area %, and a hepta or higher nuclear body of 19.9 area %)

E7: Phenol novolac epoxy resin obtained in Synthesis Example 9 (an epoxy equivalent of 175, an Mn of 858, a trinuclear body of 20.7 area %, and a hepta or higher nuclear body of 48.5 area %)

E8: Phenol novolac epoxy resin (commercially available from NIPPON STEEL Chemical & Material Co., Ltd., YDPN-6300, an epoxy equivalent of 175, an Mn of 653, a trinuclear body of 35.2 area %, and a hepta or higher nuclear body of 21.8 area %)

E9: Phenol novolac epoxy resin (commercially available from NIPPON STEEL Chemical & Material Co., Ltd., YDPN-638, an epoxy equivalent of 178, an Mn of 662, a trinuclear body of 14.7 area %, and a hepta or higher nuclear body of 38.6 area %)

E10: Phenol novolac epoxy resin (commercially available from DIC Corporation, N775, an epoxy equivalent of 187, an Mn of 1308, a trinuclear body of 6.7 area %, and a hepta or higher nuclear body of 71.6 area %)

E11: Phenol novolac epoxy resin obtained in Synthesis Example 10 (an epoxy equivalent of 173, an Mn of 468, a trinuclear body of 12.1 area %, and a hepta or higher nuclear body of 19.3 area %)

E12: Trifunctional epoxy resin (commercially available from Mitsui Chemicals, Inc., VG-3101, an epoxy equivalent of 219)

[Curing Agent]

B1: Diocyandiamide (commercially available from Nippon Carbide Industries Co., Inc., dicyandiamide, an active hydrogen equivalent of 21)

B2: Triazine ring- and hydroxyphenyl group-containing compound (commercially available from Gun Ei Chemical Industry Co., Ltd., PS-6313, an active hydrogen equivalent of 148)

B3: Aralkyl type multivalent phenolic resin (commercially available from NIPPON STEEL Chemical & Material Co., Ltd., NX-1723, an active hydrogen equivalent of 152)

B4: Trisphenylmethane type multivalent phenolic resin (commercially available from Meiwa Plastic Industries, Ltd., MEH-7500H, an active hydrogen equivalent of 100)

B5: Phenol novolac resin (commercially available from Gun Ei Chemical Industry Co., Ltd., Resitop PSM-6358, a softening point of 118° C. and an active hydrogen equivalent of 106)

B6: Benzoxazine resin (commercially available from NIPPON STEEL Chemical & Material Co., Ltd., YBZ-2213, a softening point of 75° C. and an active hydrogen equivalent of 217)

B7: Benzoxazine resin (commercially available from Huntsman Corporation, LMB6490, a softening point of 98° C. and an active hydrogen equivalent of 276)

B8: Benzoxazine resin (commercially available from Shikoku Chemicals Corporation, F-a type, a softening point of 61° C. and an active hydrogen equivalent of 212)

[Others]

C1: 2-Ethyl-4-methylimidazole (curing accelerator, commercially available from Shikoku Chemicals Corporation, Curezol 2E4MZ)

FR1: Cyclophosphazene (non-halogen flame retardant, commercially available from Fushimi Pharmaceutical Co., Ltd., Rabitle FP-100, a phosphorus content of 13%)

FR2: Magnesium hydroxide (non-halogen flame retardant, filler, commercially available from Kyowa Chemical Industry Co., Ltd., Kisuma 5, an average particle size of about 0.8 to 1.0 μm)

Example 1

100 parts of HCA (commercially available from Sanko Co., Ltd., DOPO) and 185 parts of toluene were put into a 4-neck glass separable flask including a stirrer, a temperature regulating device, a reflux cooler, a total condenser, and a nitrogen gas introducing device, and heated and dissolved at 80° C. Then, 62.2 parts of 1,4-naphthoquinone (NQ) was added separately while paying attention to the temperature rise due to heat during the reaction. In this case, the molar ratio of NQ to DOPO (NQ/DOPO) was 0.85. After this reaction, 627 parts of the epoxy resin E1 was added, stirring was performed while introducing nitrogen gas, and the mixture was heated 130° C. and dissolved. 0.08 parts of triphenylphosphine (TPP) was added and reacted at 150° C. for 4 hours, 42 parts of methoxypropanol was then added and additionally reacted at 140° C. for 2 hours to obtain a phosphorus-containing epoxy resin (PE1).

Examples 2 to 8

Components were blended in blending amounts (parts) in Table 1, and the same operation as in Example 1 was performed to obtain a phosphorus-containing epoxy resin. The values of physical properties of the phosphorus-containing epoxy resins are shown in Table 1. Here, the "reaction rate" represents the consumption rate of the raw material phosphorus compound calculated from the actually measured epoxy equivalent, "L/H" represents the ratio of the content (area %, L) of trinuclear bodies to the content (area %, H) of hepta or higher nuclear bodies of the phenol novolac epoxy resin used, and "Mn/E" represents the average number of functional groups.

Reference Examples 1 to 6

Components were blended in blending amounts (parts) in Table 2, and the same operation as in Example 1 was performed to obtain a phosphorus-containing epoxy resin. The values of physical properties of the phosphorus-containing epoxy resins are shown in Table 2.

TABLE 1

| Example | 1 | 2 | 3 | 4 | 5 | 6 | 7 | 8 |
|---|---|---|---|---|---|---|---|---|
| DOPO (parts) | 100 | 100 | 100 | 100 | 100 | 100 | 100 | 100 |
| NQ (parts) | 62.2 | 62.2 | 62.2 | 62.2 | 62.2 | 72.4 | 36.6 | 68.0 |
| NQ/DOPO (molar ratio) | 0.85 | 0.85 | 0.85 | 0.85 | 0.85 | 0.99 | 0.50 | 0.93 |
| E1 (parts) | 627 | | | | | | | |
| E2 (parts) | | 627 | | | | | 431 | 542 |
| E3 (parts) | | | 627 | | | | | |
| E4 (parts) | | | | 627 | | | | |
| E5 (parts) | | | | | 627 | 715 | | |
| TPP (parts) | 0.08 | 0.08 | 0.08 | 0.08 | 0.08 | 0.09 | 0.07 | 0.08 |
| L/H | 1.9 | 1.4 | 0.6 | 1.5 | 3.4 | 3.4 | 1.4 | 1.4 |
| Mn/E | 3.8 | 4.0 | 4.8 | 4.0 | 4.0 | 3.9 | 4.0 | 4.0 |
| Phosphorus-containing epoxy resin | PE1 | PE2 | PE3 | PE4 | PE5 | PE6 | PE7 | PE8 |
| Reaction rate (%) | 78 | 72 | 70 | 72 | 72 | 100 | 100 | 67 |
| Epoxy equivalent (g/eq.) | 263 | 261 | 261 | 264 | 262 | 276 | 313 | 278 |
| Phosphorus content (%) | 1.8 | 1.8 | 1.8 | 1.8 | 1.8 | 1.6 | 2.5 | 2.0 |

TABLE 2

| Reference Example | 1 | 2 | 3 | 4 | 5 | 6 |
|---|---|---|---|---|---|---|
| DOPO (parts) | 100 | 100 | 100 | 100 | 100 | 100 |
| NQ (parts) | 62.2 | 62.2 | 62.2 | 62.2 | 62.2 | 68.0 |
| NQ/DOPO (molar ratio) | 0.85 | 0.85 | 0.85 | 0.85 | 0.85 | 0.93 |
| E6 (parts) | 627 | | | | | |
| E7 (parts) | | 627 | | | | |
| E8 (parts) | | | 627 | | | |
| E9 (parts) | | | | 627 | | |
| E10 (parts) | | | | | 627 | |
| E11 (parts) | | | | | | 542 |
| TPP (parts) | 0.08 | 0.08 | 0.08 | 0.08 | 0.08 | 0.17 |
| L/H | 2.1 | 0.4 | 1.6 | 0.4 | 0.1 | 0.6 |

TABLE 2-continued

| Reference Example | 1 | 2 | 3 | 4 | 5 | 6 |
|---|---|---|---|---|---|---|
| Mn/E | 3.6 | 4.9 | 3.7 | 3.7 | 7.0 | 2.7 |
| Phosphorus-containing epoxy resin | PEH1 | PEH2 | PEH3 | PEH4 | PEH5 | PEH6 |
| Reaction rate (%) | 78 | 69 | 72 | 72 | 60 | 100 |
| Epoxy equivalent (g/eq.) | 263 | 264 | 266 | 272 | 278 | 317 |
| Phosphorus content (%) | 1.8 | 1.8 | 1.8 | 1.8 | 1.8 | 2.0 |

Example 9

100 parts of the phosphorus-containing epoxy resin (PE1), 3.7 parts of the curing agent (B1), and 0.5 parts of a 10% boric acid methanol solution were blended. The epoxy resin during blending in the form of a varnish dissolved in methyl ethyl ketone was prepared, the curing agent was dissolved and blended in a mixed solvent containing methoxypropanol and N,N-dimethylformamide, and the non-volatile content was adjusted to 50% with methyl ethyl ketone and methoxypropanol. Then, adjustment was performed using a methoxypropanol solution of a curing accelerator (2E4MZ) so that the gel time in the varnish at 171° C. was 150 to 350 seconds, and thereby a phosphorus-containing epoxy resin composition varnish was obtained.

The obtained phosphorus-containing epoxy resin composition varnish was impregnated into a glass cloth (WEA 7628 XS13, 0.18 mm thickness, commercially available from Nitto Boseki Co., Ltd.), and the glass cloth was then dried in an all-exhaust dry oven at 150° C. for 8 minutes to obtain a prepreg. The eight obtained prepregs were laminated, a copper foil (commercially available from Mitsui Mining & Smelting Co., Ltd., 3EC, 35 μm thickness) was additionally laminated on the top and the bottom, the laminated plate was preheated in a vacuum press machine at 130° C. for 15 minutes, and then pressed and molded at 2 MPa and at a curing condition of 190° C. for 80 minutes and a laminated plate with a thickness of about 1.6 mm was obtained. The tests for the Tg, flame retardancy, flaming time, tracking resistance, copper foil peeling strength, interlayer adhesion of the obtained laminated plate were performed, and the results are shown in Table 3.

Examples 10 to 16

Components were blended in blending amounts (parts) in Table 3, and the same operation as in Example 9 was performed to obtain a laminated plate. The same test as in Example 9 was performed, and the results are shown in Table 3.

Comparative Examples 1 to 6

Components were blended in blending amounts (parts) in Table 4, and the same operation as in Example 9 was performed to obtain a laminated plate. The same test as in Example 9 was performed, and the results are shown in Table 4.

TABLE 3

| Example | 9 | 10 | 11 | 12 | 13 | 14 | 15 | 16 |
|---|---|---|---|---|---|---|---|---|
| phosphorus-containing epoxy resin | PE1 | PE2 | PE3 | PE4 | PE5 | PE6 | PE7 | PE8 |
| (parts) | 100 | 100 | 100 | 100 | 100 | 100 | 75 | 70 |
| E2 (parts) | | | | | | | 25 | |
| E12 (parts) | | | | | | | | 30 |
| B1 (parts) | 3.7 | 3.7 | 3.7 | 3.7 | 3.7 | 3.8 | 4.1 | 3.8 |
| FR2 (parts) | | | | | | | | 18.3 |
| Phosphorus content (%) | 1.7 | 1.7 | 1.7 | 1.7 | 1.7 | 1.5 | 1.8 | 1.3 |
| Tg (° C.) | 202 | 207 | 215 | 208 | 206 | 217 | 203 | 208 |
| Flame resistance | V-0 | V-0 | V-0 | V-0 | V-0 | V-0 | V-0 | V-0 |
| Flaming time (seconds) | 41 | 46 | 48 | 44 | 39 | 49 | 47 | 38 |
| Tracking resistance (V) | 225 | 225 | 225 | 250 | 275 | 300 | 250 | 300 |
| Copper foil peeling strength (kN/m) | 1.8 | 1.9 | 1.7 | 1.9 | 1.8 | 1.7 | 1.8 | 1.6 |
| Interlayer adhesion (kN/m) | 1.0 | 1.0 | 1.0 | 1.1 | 1.2 | 1.1 | 1.1 | 1.0 |

TABLE 4

| Comparative Example | 1 | 2 | 3 | 4 | 5 | 6 |
|---|---|---|---|---|---|---|
| phosphorus-containing epoxy resin | PEH1 | PEH2 | PEH3 | PEH4 | PEH5 | PEH6 |
| (parts) | 100 | 100 | 100 | 100 | 100 | 100 |
| B1 (parts) | 3.7 | 3.6 | 3.6 | 3.5 | 3.3 | 3.3 |
| Phosphorus content (%) | 1.7 | 1.7 | 1.7 | 1.7 | 1.7 | 1.9 |
| Tg (° C.) | 192 | 216 | 190 | 189 | 192 | 150 |
| Flame resistance | V-0 | V-1 | V-0 | V-1 | V-1 | V-0 |
| Flaming time (seconds) | 41 | 128 | 40 | 82 | 123 | 42 |
| Tracking resistance (V) | 225 | 225 | 200 | 200 | 200 | 175 |
| Copper foil peeling strength (kN/m) | 1.8 | 1.7 | 1.7 | 1.7 | 1.1 | 2.0 |
| Interlayer adhesion (kN/m) | 1.0 | 1.0 | 1.1 | 1.1 | 0.7 | 1.2 |

Examples 17 to 28 and Comparative Examples 7 to 9

Components were blended in blending amounts (parts) in Table 5, the same operation as in Example 9 was performed to obtain a phosphorus-containing epoxy resin composition varnish, and FR1 and FR2 were then added separately while shear-stirring at 5,000 rpm using a Homo Disper, and the mixture was uniformly dispersed for about 10 minutes. The same operation as in Example 9 was performed except that the curing conditions were changed to 210° C.×80 minutes, and thereby a laminated plate test piece was obtained. The same test as in Example 9 was performed, and the results are shown in Table 5.

TABLE 5

| | Example | | | | | | | | | | | | Comparative Example | | |
|---|---|---|---|---|---|---|---|---|---|---|---|---|---|---|---|
| | 17 | 18 | 19 | 20 | 21 | 22 | 23 | 24 | 25 | 26 | 27 | 28 | 7 | 8 | 9 |
| Phosphorus-containing epoxy resin | PE2 | PE2 | PE2 | PE2 | PE8 | EP2 | EP2 | EP2 | EP2 | EP2 | EP2 | EP2 | PEH4 | PEH6 | PEH6 |
| (parts) | 100 | 100 | 100 | 100 | 70 | 100 | 100 | 100 | 100 | 100 | 100 | 100 | 100 | 100 | 70 |
| E12 (parts) | | | | | 30 | | | | | | | | | | 30 |
| B1 (parts) | | | 1.9 | | | | | | | | | | | | |
| B2 (parts) | 20.9 | | | | | | | | | | | | 20.0 | | |
| B3 (parts) | | 53.7 | | | | | | | | | 26.9 | 26.9 | | 48.0 | |
| B4 (parts) | | | | | 36.0 | | | | | | | | | | 36.0 |
| B5 (parts) | | | 18.7 | 18.7 | | | 12.5 | 22.5 | 18.7 | 12.5 | 18.7 | | | | |
| B6 (parts) | | | | 38.3 | | 51.1 | | | | 38.3 | | 38.3 | | | |
| B7 (parts) | | | | | | | 39.0 | 48.8 | 65.0 | | | 48.8 | | | |
| B8 (parts) | | | | | | | | | | | 37.5 | | | | |
| FR1 (parts) | 2.3 | 1.7 | | | | | | | | | | | 2.2 | | |
| FR2 (parts) | | | | | 37.3 | | | | | | | | | | 60.7 |
| Phosphorus content (%) | 1.7 | 1.3 | 1.5 | 1.1 | 1.0 | 1.1 | 1.1 | 1.1 | 1.1 | 1.2 | 1.1 | 1.0 | 1.7 | 1.4 | 1.0 |

TABLE 5-continued

| | Example | | | | | | | | | | | | Comparative Example | | |
|---|---|---|---|---|---|---|---|---|---|---|---|---|---|---|---|
| | 17 | 18 | 19 | 20 | 21 | 22 | 23 | 24 | 25 | 26 | 27 | 28 | 7 | 8 | 9 |
| Tg (° C.) | 208 | 205 | 201 | 202 | 203 | 207 | 200 | 207 | 218 | 200 | 213 | 220 | 190 | 170 | 194 |
| Flame resistance | V-0 | V-0 | V-0 | V-0 | V-0 | V-0 | V-0 | V-0 | V-0 | V-0 | V-0 | V-0 | V-1 | V-1 | V-1 |
| Flaming time (seconds) | 45 | 48 | 40 | 35 | 47 | 32 | 38 | 42 | 46 | 46 | 38 | 41 | 80 | 62 | 50 |
| Tracking resistance (V) | 225 | 250 | 225 | 300 | 325 | 300 | 300 | 325 | 325 | 300 | 300 | 325 | 200 | 200 | 325 |
| Copper foil peeling strength (kN/m) | 1.7 | 1.6 | 1.8 | 1.5 | 1.3 | 1.4 | 1.6 | 1.6 | 1.5 | 1.7 | 1.5 | 1.3 | 1.5 | 1.7 | 1.0 |
| Interlayer adhesion (kN/m) | 1.1 | 1.0 | 1.3 | 1.0 | 1.0 | 1.0 | 1.3 | 1.2 | 1.1 | 1.3 | 1.0 | 1.0 | 1.0 | 1.1 | 0.7 |

Compared with the comparative examples in which phenol novolac epoxy resins having a conventionally known molecular weight distribution and number of functional groups were used, in the examples using the phosphorus-containing epoxy resin of the present invention, high heat resistance with a Tg of 200° C. or higher was imparted, the flame retardancy of V-0 was maintained, and superior tracking resistance was observed, but in the comparative examples, deterioration of the Tg, flame retardancy, tracking resistance, and adhesiveness was observed.

INDUSTRIAL APPLICABILITY

The present invention can provide a cured product that can achieve both heat resistance with a Tg of 200° C. or higher and flame retardancy, which cannot be obtained with a conventional phosphorus-containing epoxy resin, and also has favorable tracking resistance. Therefore, the epoxy resin composition of the present invention can be widely used as electronic circuit board materials such as a copper-clad laminated plate, a film material, and a resin-coated copper foil, and electronic component materials such as a sealing material, a molding material, a casting material, an adhesive, and an electrical insulation coating material.

The invention claimed is:

1. An epoxy resin composition which contains a phosphorus-containing epoxy resin and a curing agent and has a phosphorus content of within a range of 1.0 to 1.8 mass %, wherein the phosphorus-containing epoxy resin is a product obtained from a novolac epoxy resin having a ratio (L/H) of the content (area %, L) of trinuclear bodies to the content (area %, H) of hepta or higher nuclear bodies measured by gel permeation chromatography of within a range of 0.6 to 4.0, and having an average number of functional groups (Mn/E) obtained by dividing a number average molecular weight (Mn) based on a standard polystyrene conversion value by an epoxy equivalent (E) of within a range of 3.8 to 4.8, and a phosphorus compound represented by the following general formula (1) and/or general formula (2):

[Chem. 1]

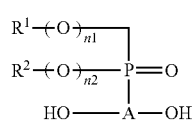

(1)

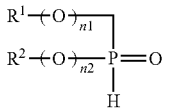

(2)

in the formulas, $R^1$ and $R^2$ are a hydrocarbon group having 1 to 20 carbon atoms which may have heteroatoms, and may be different from each other or may be the same, and may be linear, branched, or cyclic, or $R^1$ and $R^2$ may be bonded to form a cyclic structure site; n1 and n2 each independently represent 0 or 1; and A represents a trivalent aromatic hydrocarbon group having 6 to 20 carbon atoms.

2. The epoxy resin composition according to claim 1, wherein
the novolac epoxy resin is a phenol novolac epoxy resin.

3. The epoxy resin composition according to claim 1, wherein
the curing agent contains one or more selected from among dicyandiamide, phenolic resins and oxazine resins.

4. A prepreg in which the epoxy resin composition according to claim 1 is impregnated into a substrate.

5. A laminated plate which is a cured product of the epoxy resin composition according to claim 1.

6. A material for circuit boards, the material being obtained by using the epoxy resin composition according to claim 1.

7. A cured product obtained by curing the epoxy resin composition according to claim 1.

8. A method of producing a phosphorus-containing epoxy resin obtained from a novolac epoxy resin and a phosphorus compound represented by the following general formula (1) and/or general formula (2), and in which the novolac epoxy resin has a ratio (L/H) of the content (area %, L) of trinuclear bodies to the content (area %, H) of hepta or higher nuclear bodies measured by gel permeation chromatography of within a range of 0.6 to 4.0, and an average number of functional groups (Mn/E) obtained by dividing a number average molecular weight (Mn) based on a standard polystyrene conversion value by an epoxy equivalent (E) of within a range of 3.8 to 4.8:

[Chem. 2]

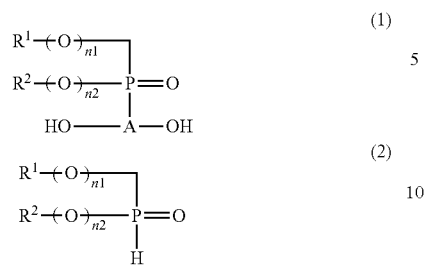

(1)

(2)

in the formula, $R^1$ and $R^2$ are a hydrocarbon group having 1 to 20 carbon atoms which may have heteroatoms, and may be different from each other or may be the same, and may be linear, branched, or cyclic, or $R^1$ and $R^2$ may be bonded to form a cyclic structure site; n1 and n2 each independently represent 0 or 1; and A represents a trivalent aromatic hydrocarbon group having 6 to 20 carbon atoms.

\* \* \* \* \*